United States Patent
Saitoh (10) Patent No.: US 7,490,259 B2
(45) Date of Patent: Feb. 10, 2009

(54) ERROR RECOVERY METHOD FOR DATA STORAGE DEVICE, DATA STORAGE DEVICE, AND MAGNETIC DISK STORAGE DEVICE

(75) Inventor: Hirofumi Saitoh, Kanagawa (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 540 days.

(21) Appl. No.: 11/090,672

(22) Filed: Mar. 25, 2005

(65) Prior Publication Data

US 2005/0216782 A1    Sep. 29, 2005

(30) Foreign Application Priority Data

Mar. 26, 2004   (JP)   ............... 2004-091151

(51) Int. Cl.
   *G06F 11/00*   (2006.01)
(52) U.S. Cl. .................. 714/2; 714/5; 714/42; 711/114
(58) Field of Classification Search .................. 714/45, 714/2, 55
   See application file for complete search history.

(56) References Cited

U.S. PATENT DOCUMENTS

| | | | | |
|---|---|---|---|---|
| 5,526,485 A | * | 6/1996 | Brodsky | 714/38 |
| 5,784,552 A | * | 7/1998 | Bishop et al. | 714/38 |
| 5,812,752 A | * | 9/1998 | Yamada | 714/5 |
| 5,978,911 A | * | 11/1999 | Knox et al. | 713/1 |
| 6,061,805 A | * | 5/2000 | Suzuki et al. | 714/2 |
| 2002/0038406 A1 | * | 3/2002 | Shirai et al. | 711/137 |
| 2002/0040419 A1 | * | 4/2002 | Nishikawa et al. | 711/114 |

FOREIGN PATENT DOCUMENTS

| | | |
|---|---|---|
| JP | 11-065778 | 3/1999 |
| JP | 2001-135042 | 5/2001 |
| JP | 2002-358170 | 12/2002 |

* cited by examiner

*Primary Examiner*—Gabriel L. Chu
*Assistant Examiner*—Chae Ko
(74) *Attorney, Agent, or Firm*—Townsend and Townsend and Crew LLP; Patrick Duncan (57) ABSTRACT

Embodiments of the invention increase the probability of error recovery in error recovery processing. When a reset command is received during an error recovery procedure (ERP), a timer is started in response to the reset command. From the time at which the reset command has been received until the predetermined time prescribed by the timer passes, the ERP step is continued. After the timer expires, the ERP processing stops on the completion of an ERP step M. Additionally, a HDD returns to a host a reset ready, which represents the completion of the reset. Since the ERP is continued even after the reset command is received, it is possible to increase the probability of error recovery.

18 Claims, 6 Drawing Sheets

PRIOR ART

ERROR RECOVERY METHOD FOR DATA STORAGE DEVICE, DATA STORAGE DEVICE, AND MAGNETIC DISK STORAGE DEVICE

This application claims priority from Japanese Patent Application No. JP2004-091151, filed Mar. 26, 2004, the entire disclosure of which is incorporated herein by reference.

BACKGROUND OF THE INVENTION

The present invention relates to error recovery processing used in a data storage device.

Devices using various types of media such as optical disks and magnetic tapes are known as data storage devices. Among them, hard disk drives (HDDs), which store data in magnetic disks, have become popular as storage devices for computers to such an extent that they are one of the storage devices indispensable for today's computer systems. Further, not limited to computers, these applications are spread, due to the superior characteristics, in a broader range including moving picture recording/reproducing devices, car navigation systems, and removable memories for digital cameras.

Each magnetic disk used in HDDs has a plurality of tracks formed concentrically. In each track, address information (servo information) and user data are stored. Accessing a desired area (sector) according to the address information by the magnetic head formed of a thin film element enables either data write to the sector or data read from the sector. A signal read out from a magnetic disk through data read operation is subjected to waveform shaping, decoding processing and other prescribed signal processing by a signal processing circuit before transmitted to a host. Data transmitted from the host is also subjected to prescribed processing by the signal processing circuit in like manner before being written to the magnetic disk.

If an error occurs during data write to or data read from the magnetic disk, ERP (Error Recovery Procedure) processing is executed. The ERP processing recovers the error by executing ERP steps stored beforehand corresponding to the error. Conditions of data write/data read are changed at each ERP step. Thus, the ERP processing performs the error recovery by repeating data write processing/data read processing under different conditions. The ERP processing is disclosed in, for example, patent document 1. In Japanese Patent Laid-open No. 10-161818, the following method for executing the ERP processing is disclosed as the prior art. This method will be described with reference to FIG. 6.

Figure 6:
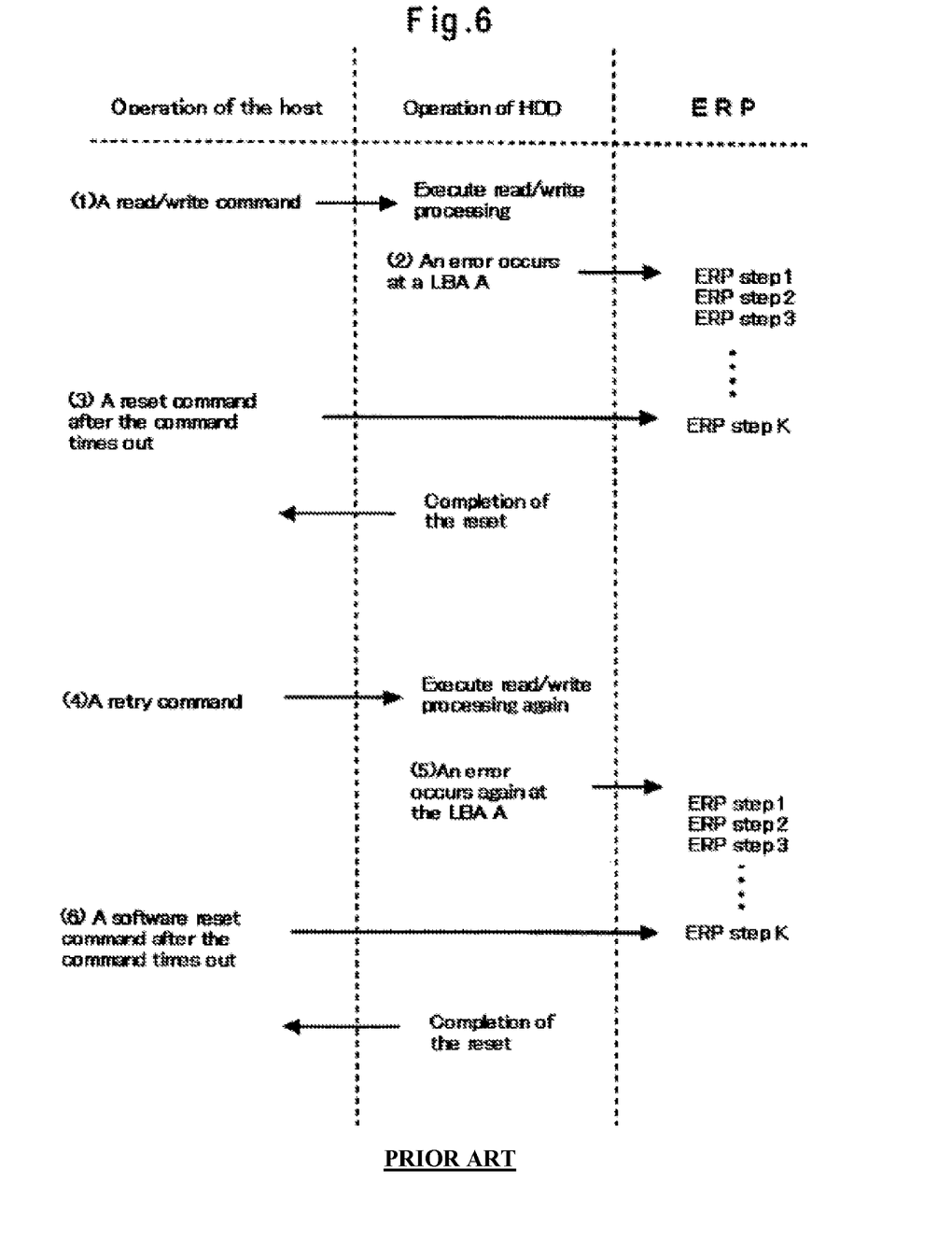
FIG. 6 is a sequence diagram illustrating an outline of a known ERP.

(1) A host system transmits a read command or a write command to a HDD. The HDD executes read processing or write processing according to the command.

(2) In the event that a read error or a write error occurs at a logical block address (LBA) "A", a MPU successively executes ERP processing from an ERP step 1 through a HDC and a channel.

(3) In a system in which the length of time until time out is shorter than the execution time of all steps of the ERP processing (it is assumed that the number of steps is M), if the error is not recovered as a result of executing up to an ERP step K (<M), the MPU receives a reset command from the host system. Consequently, the ERP processing is stopped at the ERP step K, and then the HDD transmits a reset completion signal to the host.

(4) The host system transmits a retry command to the HDD, and the HDD then executes reread or rewrite in response to the retry command.

(5) In the event that a read error or a write error occurs again at the LBA "A", the ERP processing is successively executed from the ERP step 1 again.

(6) Because the length of time until time out is usually constant in the system, if the error is not recovered as a result of executing up to the ERP step K, the MPU receives a reset command from the host system. Consequently, the ERP processing is stopped at the ERP step K, and then the HDD transmits a reset completion signal to the host.

In the above-mentioned method, the length of time until time out is shorter than the execution time of all steps of the ERP processing. In addition to it, at the time of retry, the ERP processing is executed from the ERP step 1 again. Therefore, the ERP steps (k+1) through M are not executed. Accordingly, even if between the ERP step (k+1) and M there is a step that is effective for a certain error, the step is not executed. Because of it, the possibility that the error will be recovered is low.

In order to solve this problem, the patent reference proposes that if the execution of the ERP processing is interrupted due to time out, at the time of retry the ERP processing is executed from a step subsequent to the ERP step that has been executed last. Restarting the ERP processing from the interrupted ERP step makes it possible to execute more unexecuted ERP steps, resulting in the increase in probability of error recovery.

BRIEF SUMMARY OF THE INVENTION

According to the ERP processing described in Japanese Patent Laid-open No. 10-161818, it is possible to execute more ERP steps at the time of retry, which results in the increase in probability of error recovery. If the host receives no response to a reset command, the host disconnects the HDD. Therefore, the HDD is required to respond to the reset command. On the other hand, from the issuance of the reset command until the disconnection, a fixed period of time is reserved. The HDD, therefore, has only to send the host a response to the reset command before this period of time passes (time out). However, as far as the ERP processing disclosed in the patent reference is concerned, the processing is immediately stopped in response to the reset command sent from the host, and then a completion notification for the received reset command is transmitted to the host. Accordingly, the period of time from the issuance of the reset command until time out cannot be effectively used. As a result, the number of executable ERP steps is limited.

The present invention has been made taking the above-mentioned situations into consideration. A feature of the present invention is to increase the number of executable ERP steps in the ERP processing, and thereby to increase the probability of error recovery.

According to a first aspect of the present invention, there is provided an error recovery method for a data storage device. The method comprises: in response to occurrence of an error relating to a first command received from a host, starting an error recovery procedure including a plurality of error recovery steps; receiving a second command from the host during the error recovery procedure; continuing the error recovery procedure after receiving the second command; and after a lapse of predetermined time after receiving the second command, transmitting to the host a completion notification for the second command.

Continuing the error recovery procedure after the second command has been received makes it possible to increase the probability of error recovery. In addition, by transmitting to the host the completion notification for the second command after a lapse of predetermined time, it is possible to send the host a response without fail.

If the second command is a reset command, the present invention is particularly useful. Since the completion notification is transmitted after a lapse of predetermined time used for the reset command, it is possible to effectively prevent the host from performing disconnection. If the first command is a read command or a write command, the present invention is particularly useful.

The error recovery method may further comprise stopping the error recovery procedure, which is being continued, after a lapse of predetermined time after receiving the second command. This makes it possible to effectively execute the error recovery steps within the allowable time.

Moreover, the error recovery method may further comprise starting a timer in response to the receipt of the second command. The step for stopping the error recovery procedure, which is being continued, stops the error recovery procedure, which is being continued, in response to the expiration of the timer. In addition, the step for transmitting a completion notification for the second command transmits a completion notification for the second command in response to the expiration of the timer.

Controlling by the timer the error recovery procedure and the transmission of a completion notification makes it possible to execute the error recovery procedure without fail in response to the transmission of the completion notification.

The error recovery method may further comprise: after transmitting the completion notification for the second command, receiving from the host a retry command for the first command; and in processing executed in response to the retry command, restarting the stopped error recovery processing in response to the occurrence of the same error.

Further, restarting the stopped error recovery procedure preferably restarts the error recovery procedure from an error recovery step subsequent to the error recovery step that has been completed last in the stopped error recovery procedure. This makes it possible to eliminate the execution of duplicated error recovery steps, and thereby to execute more unexecuted error recovery steps.

According to a second aspect of the present invention, there is provided a data storage device. The data storage device comprises: an interface unit for interfacing with a host for communication data; and an error recovery execution unit, which executes error recovery procedure including a plurality of error recovery steps in response to occurrence of an error relating to a first command received from a host. The error recovery execution unit continues the error recovery procedure after receiving a second command. The interface unit transmits to the host a completion notification for the second command after a lapse of predetermined time after receiving the second command.

Continuing the error recovery procedure after the second command is received makes it possible to increase the probability of error recovery. In addition, by transmitting to the host the completion notification for the second command after a lapse of predetermined time, it is possible to send the host a response without fail.

The error recovery execution unit preferably stops the error recovery procedure after a lapse of predetermined time after receiving the second command. If the second command is a command for canceling the first command, or if the first command is a data read command or a data write command, the present invention is particularly useful.

The data storage device may further comprise a time measuring unit for measuring time in response to the receipt of the second command. The error recovery execution unit stops the error recovery procedure in response to the time measured by the time measuring unit. The interface unit transmits to the host a completion notification for the second command in response to the measured by the time measuring unit.

In an error recovery procedure for a retry command corresponding to the first command, the error recovery execution unit preferably restarts the stopped error recovery procedure. Moreover, the error recovery execution unit preferably stores data that can identify an error recovery step that has been completed last in the stopped error recovery procedure, and thereby restarts the stopped error recovery procedure from an error recovery step determined according to the stored data. Further, the error recovery execution unit preferably restarts the stopped error recovery procedure from an error recovery step subsequent to the error recovery step that has been completed last in the stopped error recovery procedure.

According to a third aspect of the present invention, there is provided a magnetic disk storage device. The magnetic disk storage device comprises: a magnetic disk for storing data of a host; an interface unit for interfacing with a host for communication data; and an error recovery execution unit, which executes an error recovery procedure including a plurality of error recovery steps in response to occurrence of an error relating to a read command or a write command received from the host. After a lapse of predetermined time after the interface unit receives a reset command from the host, the interface unit transmits to the host a completion notification for the reset command. The error recovery execution unit continues the error recovery procedure after receiving the reset command, stops the error recovery procedure after a lapse of predetermined time after receiving the reset command, and then in response to the occurrence of the same error during processing of a retry command corresponding to the read command or the write command, the error recovery execution unit restarts the stopped error recovery procedure from an error recovery step subsequent to the error recovery step that has been completed last in the stopped error recovery procedure.

According to the present invention, it is possible to increase the number of executable error recovery steps in the error recovery procedure, and thereby to increase the probability of error recovery.

DETAILED DESCRIPTION OF THE INVENTION

Embodiments of the present invention will thereinafter be described. The following describes how the present invention is applicable and is not intended to limit the scope of the present invention to the embodiments cited below. For clarification of the explanation, omission and simplification are made, where appropriate, in the following description and drawings. Those skilled in the art will be able to easily make modifications, additions and alternations to each element of the embodiments within the scope of the preset invention. Also note that identical reference numerals are used to designate identical elements that are common to the figures and redundant description is omitted as appropriate for clarification of the explanation.

Figure 1:
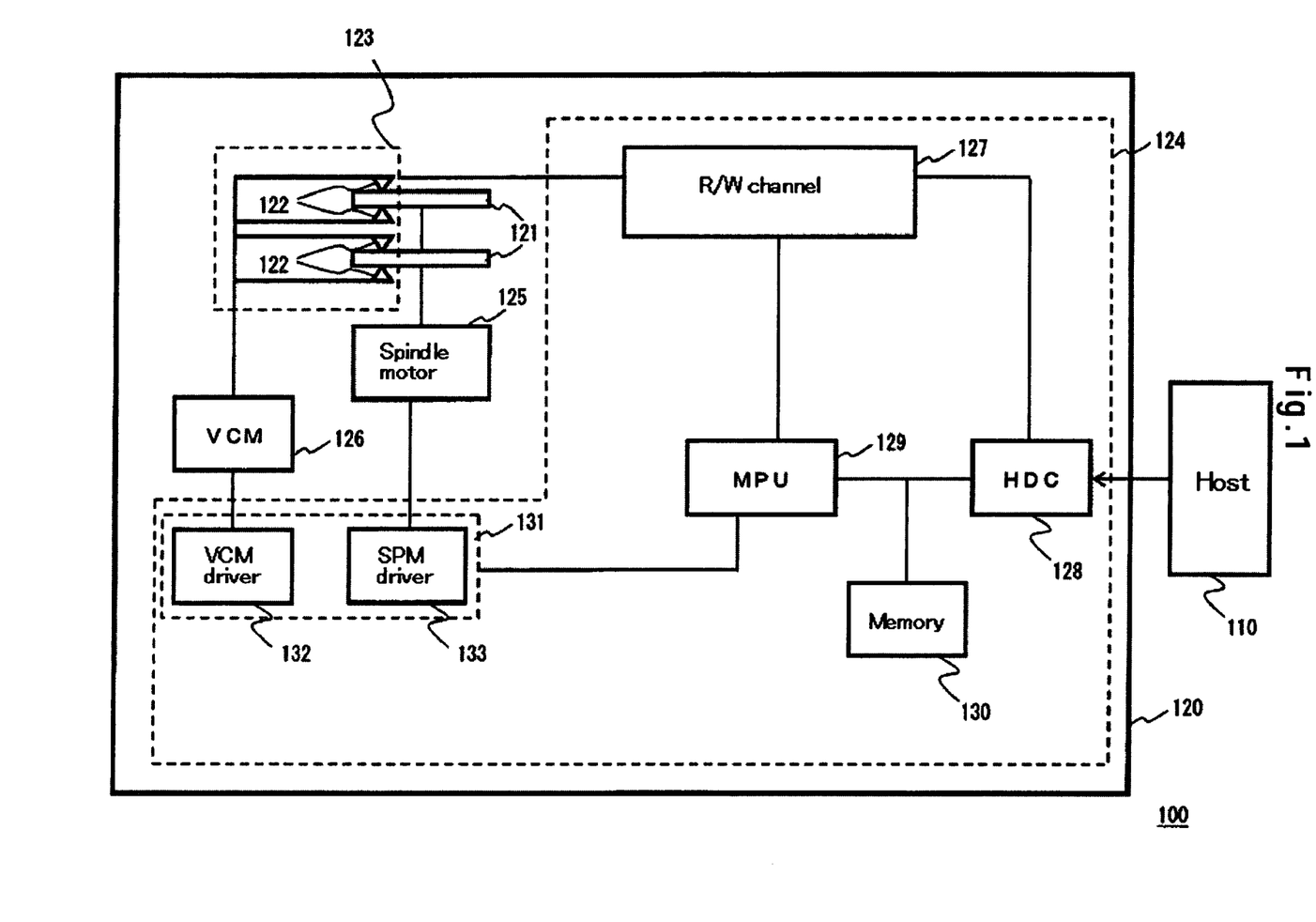
FIG. 1 is a block diagram illustrating a general configuration of a data processing system according to an embodiment of the present invention.

To begin with, a general configuration of a data processing system including a HDD according to the present embodiment will be described. FIG. 1 is a block diagram illustrating a general configuration of a data processing system 100 according to the present embodiment. The data processing system 100 includes a host 110 and a hard disk drive (HDD) 120. The host 110 is a computer, a digital camera or the like performing data processing. The hard disk drive (HDD) 120 is an example of a data storage device. The hard disk drive 120 includes one or more magnetic disks 121, head stack assemblies 123, and a controller 124. The controller 124 controls these elements in order to write and read data to and from the magnetic disk 121. The magnetic disk 121 is an example of a storage medium for storing data transmitted from the host 110. The head stack assemblies 123 have magnetic heads 122 associated respectively with the recording surfaces of the magnetic disks 121, each of the magnetic heads being formed of a thin film element. The magnetic head 122 accesses a storage area of the magnetic disk 121 to read or write data.

Host user data transmitted from the host 110 is subjected to necessary processing and converted into a write signal by the controller 124 before the write signal is sent to the head stack assembly 123. According to the acquired write signal, the magnetic head 122 writes data to the recording surfaces of the magnetic disk 121. On the other hand, a read signal read from the magnetic disk 122 by the magnetic heads 122 is converted into a digital signal and subjected to necessary processing by the controller 124 before the digital signal is transmitted to the host 110.

The magnetic disk 121 is a nonvolatile recording medium having magnetic layers, which are magnetized to record data. When the HDD 120 is operating, the magnetic disk 121 is driven to rotate at a prescribed constant speed around the spindle of the spindle motor 125. When the HDD 120 is not operating, the magnetic disk 121 remains stationary. On the surfaces of the magnetic disk 121, a plurality of tracks are concentrically formed as data storage partitions.

On each surface of the magnetic disk 121, a plurality of servo data storage areas are formed in the radial direction of the magnetic disk 121. A user data storage area is formed between the servo data storage areas. In each track, the user data storage area is circumferentially divided into a plurality of sectors. Servo data is read out by the magnetic heads 122, making it possible to acquire information about the position of the magnetic head 122.

The head stack assembly 123 is mounted in the frame so as to be able to pivotally move along the surface of the magnetic disk 121, and is driven by a voice coil motor (VCM) 126. A slider is secured to the tip of the head stack assembly 123. The magnetic head 122 is secured to the surface of the slider surface. Each of the magnetic heads 122 is typically a thin film element in which a read head and a write head are combined. As the head stack assembly 123 pivotally moves, the magnetic head 122 moves in the radial direction of the magnetic disk 121 above the surfaces thereof. This allows the magnetic head 122 to access a desired track.

In the example shown in FIG. 1, the head stack assembly 123 has two magnetic heads 122 for each magnetic disk 121 and the two magnetic heads are respectively associated with the top and bottom surfaces of the magnetic disk 121. Incidentally, the HDD 120 can also be configured to have only one magnetic disk 121, or can also be configured to have a magnetic head 122 associated with only one side of a magnetic disk.

As shown in FIG. 1, the controller 124 includes a read/write channel (R/W channel) 127, a hard disk controller (HDC) 128, a microprocessor unit (MPU) 129, a memory 130, and a motor driver unit 131. The motor driver unit 131 includes a voice coil motor driver (VCM driver) 135 and a spindle motor driver (SPM driver) 136.

The R/W channel 127 performs write operation and read operation on data acquired from the host 110. In the write operation, write data supplied from the HDC 128 is code-modulated by the R/W channel 127. The code-modulated write data is then converted into a write signal (current signal) so that the write signal is supplied to the magnetic heads 122. The magnetic head 122 writes the data to the magnetic disk 121 by letting current flow through the coils according to the obtained signal. In addition, when data is to be supplied to the host 110, the R/W channel 127 performs read operation. In the read operation, data is picked up from data supplied from the magnetic head 122 and subjected to filtering processing, decode processing, and the like by the read/write channel 127. The read data, after subjected to the decode processing, is supplied to the HDC 128.

Operating according to micro codes loaded to the memory 130, the MPU 129 executes the general control of the HDD 120, including positioning control of the magnetic head 122, interface control, defect management, and ERP (Error Recovery Procedure), as well as data processing-related necessary processing. The ERP is in general performed if an error occurs during data write to or data read from the magnetic disk 121. In this case, the error recovery is achieved by changing conditions of the data write or the data read, and then repeating data write or data read processing. In particular, in this embodiment, the MPU 129 executes characteristic processing in the ERP processing, which will be described later in detail. When the hard disk drive 120 is started, the micro codes to operate on the MPU 129 and the data to be required for control and data processing are loaded to the memory 130 from the magnetic disk 121 or a ROM (not shown in the figure).

Digital data read out by the R/W channel 127 includes servo data in addition to user data from the host 110. The R/W channel 127 extracts the servo data from the read data that has been read out. According to micro codes, the MPU 129 performs the positioning control of the magnetic head 122 by use of the servo data. Control data from the MPU 129 is output to the VCM driver 132. The VCM driver 132 supplies driving current to the VCM 126 according to the control signal. In addition, the MPU 129 sets SPM control data to a register in the motor driver unit 131 according to micro codes in order to control the rotation of the spindle motor 125. The SPM driver 133 executes the rotational control of the spindle motor 125 according to the set SPM control data. It is to be noted that the HDD 120 can also be so devised that, for example, the HDC 128 executes the servo control.

The HDC 128 has a capability of interfacing with the host 110. The HDC 128 receives user data, control data including read and write commands, and the like, transmitted from the host 110. The received user data is transferred to the R/W channel 127. In addition, the HDC 128 transmits to the host 110 readout data from the magnetic disk, acquired from the R/W channel 127, or control data used for data transmission. Moreover, the HDC 128 executes error correction processing on the user data, and the like.

The ERP in the present embodiment will be described below. Processing of reading/writing data is executed according to a command from the host 110. In the read/write processing, the servo data on the magnetic disk 121 is read according to address data coming from the host 110, whereby the head is positioned at a desired track, and then data is read or written from or to the track. An error can occur as a result of failure in correct data read or write during the read/write processing. The error is often caused by missing of data. The missing of data is often caused by a flaw on the surface of the magnetic disk 121 encountered with time, damage due to the change of a magnetic material with time, or the like.

For example, in the read processing, data is read from the magnetic disk 121 under standard read conditions that have been set in the magnetic disk 121, the head 122, and the R/W channel. In the event that an error occurs at the time of reading under the standard conditions, the standard conditions are changed before the read is tried again. The read processing is executed again after, for example, tracking characteristics are intentionally changed, an amplification factor of the automatic gain control (AGC) for amplifying a read signal is kept, or a filter coefficient of read data is changed. The error recovery with the conditions being changed is performed by starting the ERP, which sequentially executes a plurality of error recovery steps.

Known examples of the error recovery steps in the ERP processing include AGC hold, off-track read, and skip read of a servo area, which are steps that can be executed in a short time. In addition, the known examples include butterfly seek and low revolution varnish, which are steps requiring relatively longer time. The butterfly seek repeats seek operation several times in proximity to a track where the error has occurred, and thereby performs the position control of the head again so as to position the head at a target track. The low revolution varnish achieves the error recovery by lowering the flying height of the magnetic head 122, and then by eliminating projections, contaminants, and the like, on the disk using the slider.

Incidentally, if even the ERP results in failure in writing, the failure is identified as a hardware error. Then, data reassignment is performed; more specifically, data of the sector where the error has occurred is written to a substitute sector (this is called a spare sector) on the magnetic disk 121. In addition, also at the time of reading, if data read succeeds in a given ERP step, the data is then written to a spare sector to perform data reassignment in like manner.

As described above, the ERP ends when data is correctly read or written through the given ERP step and the error is recovered. In another case, if the error is not recovered as a result of executing all ERP steps stored beforehand, the ERP ends. A reset command may also be issued from the host 110 before the ERP ends. The reset command is a command used to cancel the command that has already been issued.

After the host 110 has issued a command to the HDD 120, if a predetermined time passes (time out), the host 110 issues a reset command to the HDD 120. If the host 110 does not receive from the HDD 120 a completion response (reset ready) in response to the reset command, the host 110 disconnects the connection with the HDD 120 so that the HDD 120 cannot be seen from the host 110. Accordingly, when receiving a reset command, the HDD 120 is required to return a reset ready to the host 110 before the HDD 120 is disconnected.

In this embodiment, the ERP is interrupted in response to the reset command sent from the host 110. Additionally, in response to the received reset command, the HDD 120 returns a reset ready to the host 110. As a result, even if the HDD 120 receives a reset command from the host 110 during the ERP, the HDD 120 can prevent the connection from being disconnected by the host 110.

Moreover, the ERP of the host 110 may be started after the reset command is issued so that the host 110 sends a retry instruction to the HDD 120. The retry instruction means that by issuing the same command as the command that has been reset, the HDD 120 is instructed to execute the same processing as the processing that has been reset. In addition, if the retry processing has timed out, the host 110 issues a reset command again. Typically, the number of times retry is allowed during the ERP processing of the host 110 is predetermined. If read/write processing is not successfully completed by the retry repeated the predetermined number of times, it is handled as a hardware error, or data is reassigned to a spare area of the magnetic disk 121.

As described above, the ERP is achieved by sequentially executing a plurality of ERP steps, each of which is stored beforehand corresponding to each command. If the error is recovered by any one of the ERP steps, the ERP ends. Accordingly, in order to increase the probability of error recovery while reducing the number of times the retry is performed, it is preferable to execute as many ERP steps as possible for each retry.

For example, by increasing the number of ERP steps that can be completed during each retry, it is possible to increase the number of times the ERP can be completed during each retry. If the number of retry times required to complete all of the ERP steps is two or more, it is possible to increase the possibility of achieving the error recovery at an early retry stage. In addition, since the ERP is constituted of many steps, also in a case where it is difficult to complete all of the ERP steps within the prescribed number of retry times of the host 110, it is possible to execute more ERP steps. Accordingly, the probability of error recovery can be dramatically increased.

In this embodiment, the number of ERP steps that can be executed during each retry is increased. Therefore, without returning a reset ready immediately after receiving a reset command from the host 110, the HDD returns the reset ready to the host 110 after a lapse of predetermined time upon receiving the reset command. From the time at which the reset command has been received until the reset ready is returned, the ERP is executed. As a result, the number of ERP steps that can be executed during each retry can be increased. From the time at which the reset command has been issued until the disconnection, there is a possibility that time out will occur. Accordingly, returning a reset ready before the time out occurs makes it possible to avoid the disconnection.

Moreover, in this embodiment, if the ERP is interrupted by a reset command, the ERP is restarted from the interrupted ERP step in response to a retry instruction sent from the host 110. This can prevent duplicated ERP steps from being executed. Accordingly, it is possible to effectively execute the ERP. As described above, by increasing the number of ERP steps that can be executed during each retry, and by preventing duplicated ERP steps from being executed, it is possible to remarkably improve the probability of error recovery in the ERP processing.

Figure 2:
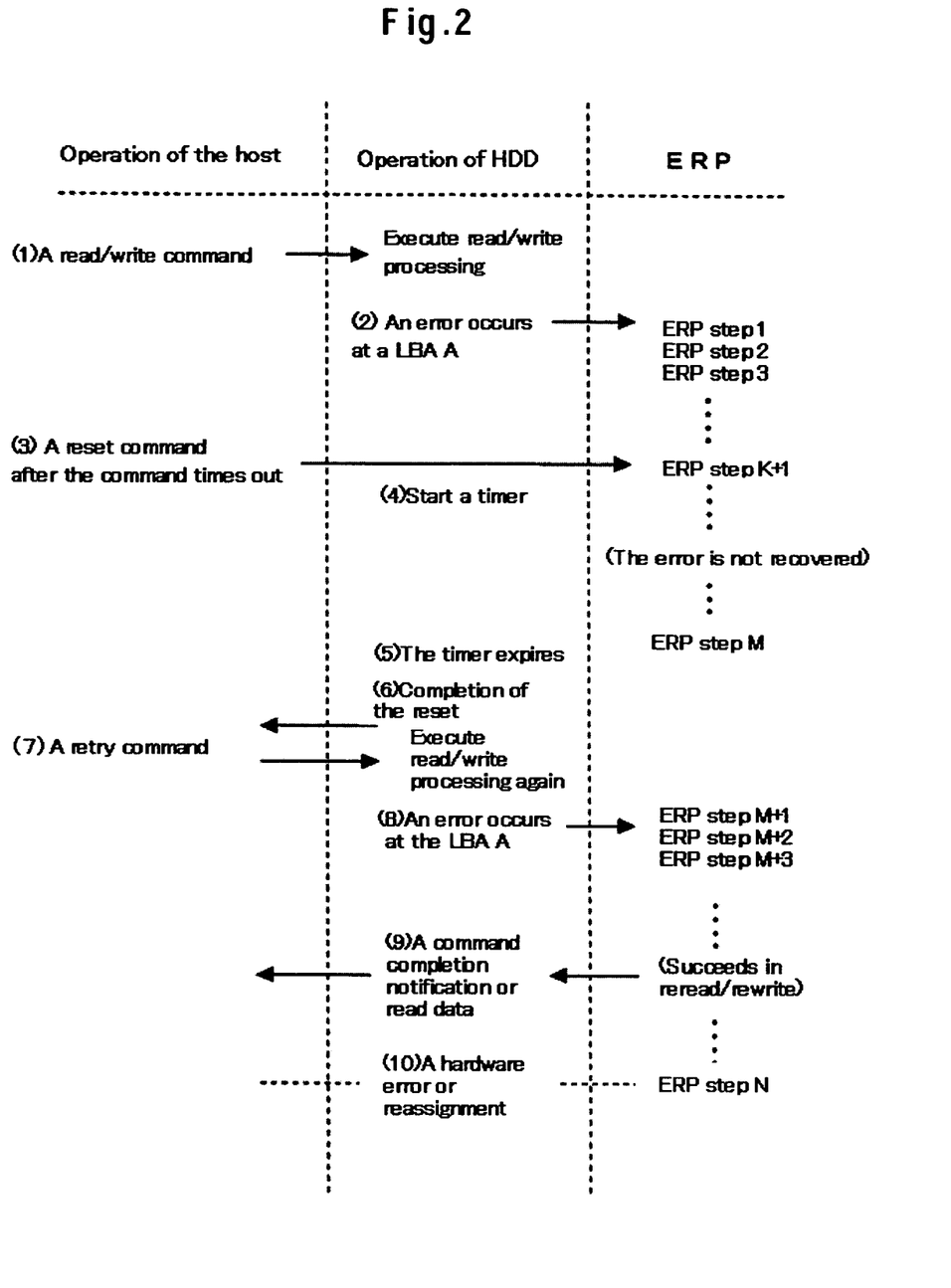
FIG. 2 is a sequence diagram illustrating an outline of an ERP according to an embodiment of the present invention.

With reference to FIG. 2, the ERP according to this embodiment will be outlined below. FIG. 2 is a sequence diagram illustrating operation of the host 110, operation of the HDD 120, and the ERP in the HDD 120. The execution of the ERP processing is controlled by micro codes operating on the MPU 129.

(1) To begin with, a read command or a write command is issued from the host 110 to the HDD 120. The HDD 120 receives the read command or the write command, and then executes read processing or write processing according to the command.

(2) In the event that a read error or a write error occurs at a logical block address (LBA) "A", an ERP program is called from the memory 130, and then the MPU 129 sequentially executes ERP steps of the ERP from an ERP step 1 through the HDC 128, the R/W channel 127, and the like.

(3) Assume a system in which a period of time until time out at which a reset command is issued is shorter than the execution time required to execute all steps (the number of steps is N) of the ERP. In the system, if the error has not yet been recovered as a result of executing the ERP up to an ERP step K (<N), the MPU 129 receives a reset command from the host 110.

(4) The HDD 120 starts a timer in response to the reset command. In addition, from the time at which the reset command has been received until the predetermined time prescribed by the timer passes, the MPU 129 executes ERP steps (K+1) through M.

(5) After the predetermined time passes, causing the timer to expire, the ERP stops as soon as the ERP step M ends.

(6) Additionally, the HDD 120 returns to the host 110 a reset ready, which represents the completion of the reset. Incidentally, if the error is recovered before the execution of the ERP up to the ERP step K is completed, the HDD 120 transmits to the host 110 a command completion notification (it is assumed that read data is also included in the command completion notification). In another case, if the error is recovered before the execution of the ERP from the ERP step K to M is completed, a reset ready is returned to the host 110.

(7) If the host 110 issues to the HDD 120 a retry command (this is the same as the command that has been reset), the HDD 120 executes reread or rewrite in response to the received retry command. The number of retry times differs depending on the host 110.

(8) If the error is not recovered, there is in general a high probability that an error will occur again at the same LBA. In the event that a read error or a write error occurs again at the LBA "A", the ERP program is called from the memory 130, and then the MPU 129 restarts the ERP from the ERP step (M+1) through the HDC 128, the R/W channel 127, and the like. If neither a read error nor a write error occurs at the LBA "A", the processing proceeds to a step (9). Incidentally, if a read error or a write error newly occurs at a LBA other than the LBA "A", the ERP is sequentially executed from the ERP step 1 as usual.

(9) If the HDD 120 succeeds in reread, the HDD 120 transmits read data to the host. If the HDD 120 succeeds in rewrite, it transmits a command completion notification to the host 110. If the error is not recovered and a reset command is received from the host 110 before all of the ERP steps are completed, processing from the step (3) to the step (9) is repeated.

(10) If the error is not recovered as a result of executing up to an ERP step N, which is the last step of the ERP, the error is recognized as a hardware error in the case of the read command. On the other hand, in the case of the write command, data is reassigned to another physical block address (PBA), and the data is then written to the reassigned PBA.

Figure 3:
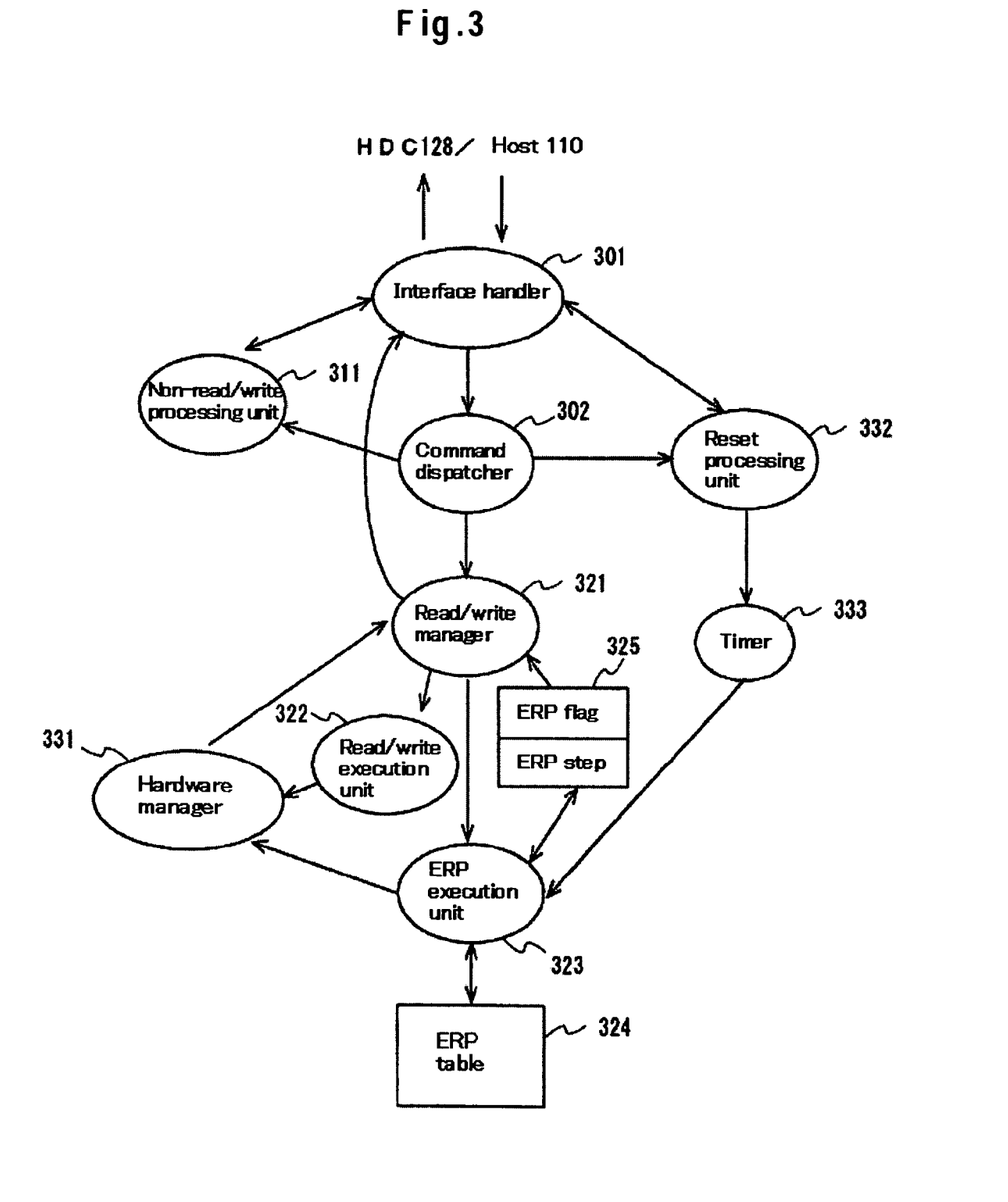
FIG. 3 is a block diagram illustrating a logical configuration of a system relating to the ERP of the embodiment.

FIG. 3 is a block diagram illustrating a logical configuration of a system relating to the ERP of the present embodiment. Each logical block can be configured by executing micro codes on the MPU 129, or by storing given data in the memory 130. In FIG. 3, reference numeral 301 denotes an interface handler, which is an example of an interface unit used to perform command/data communication with the host 110 through the HDC 128; and reference numeral 302 denotes a command dispatcher for dispatching to each execution block a command sent from the host 110. Reference numeral 311 denotes a non-read/write processing unit, which executes non-read/write commands.

Reference numeral 321 denotes a read/write manager, which controls, according to a read/write command, read/write processing and each block for performing the processing. The read/write manager 321 judges a command and a status, and thereby determines which process is to be executed next. Reference numeral 322 denotes a read/write execution unit, which executes a read/write command. Reference numeral 323 denotes an ERP execution unit, which executes the ERP. The MPU 129 operates according to the micro codes, and consequently each of the blocks functions. Reference numeral 324 denotes an ERP table to which contents of the ERP processing are written. The ERP execution unit 323 executes ERP steps with reference to this table. The ERP table 324 is stored in the memory 130. A plurality of ERP steps each corresponding to each error is written to the ERP table 324. Reference numeral 325 denotes an area of the memory 130, which stores control data used to control the ERP.

Reference numeral 331 denotes a hardware manager, which controls the HDC 128, the R/W channel 127, the driver unit 131 and other hardware units according to a command from the host 110. The hardware manager 331 controls the hardware according to a request from the non-read/write processing unit 311, the read/write execution unit 322, or the ERP execution unit 323. Reference numeral 332 denotes a reset processing unit, which performs processing of a reset command sent from the host 110. Reference numeral 333 denotes a timer, which is an example of a time measuring unit. The timer measures time, and notifies of a lapse of predetermined time. These blocks can also be configured by micro codes executed on the MPU 129.

Data processing of the logical configuration shown in FIG. 3 will be described. To begin with, an outline of the processing to be executed will be described with reference to FIG. 4. Upon receipt of a command from the host 110 (S401), the interface handler 301 passes the command to the command dispatcher 302. According to a kind of the command, the command dispatcher 302 handles the command as a read/write command or a non-read/write command (S402). The read/write command is dispatched to the read/write manager 321. On the other hand, the non-read/write command is dispatched to the non-read/write processing unit 311. The non-read/write processing unit 311 executes processing according to the dispatched command (S403).

Figure 4:
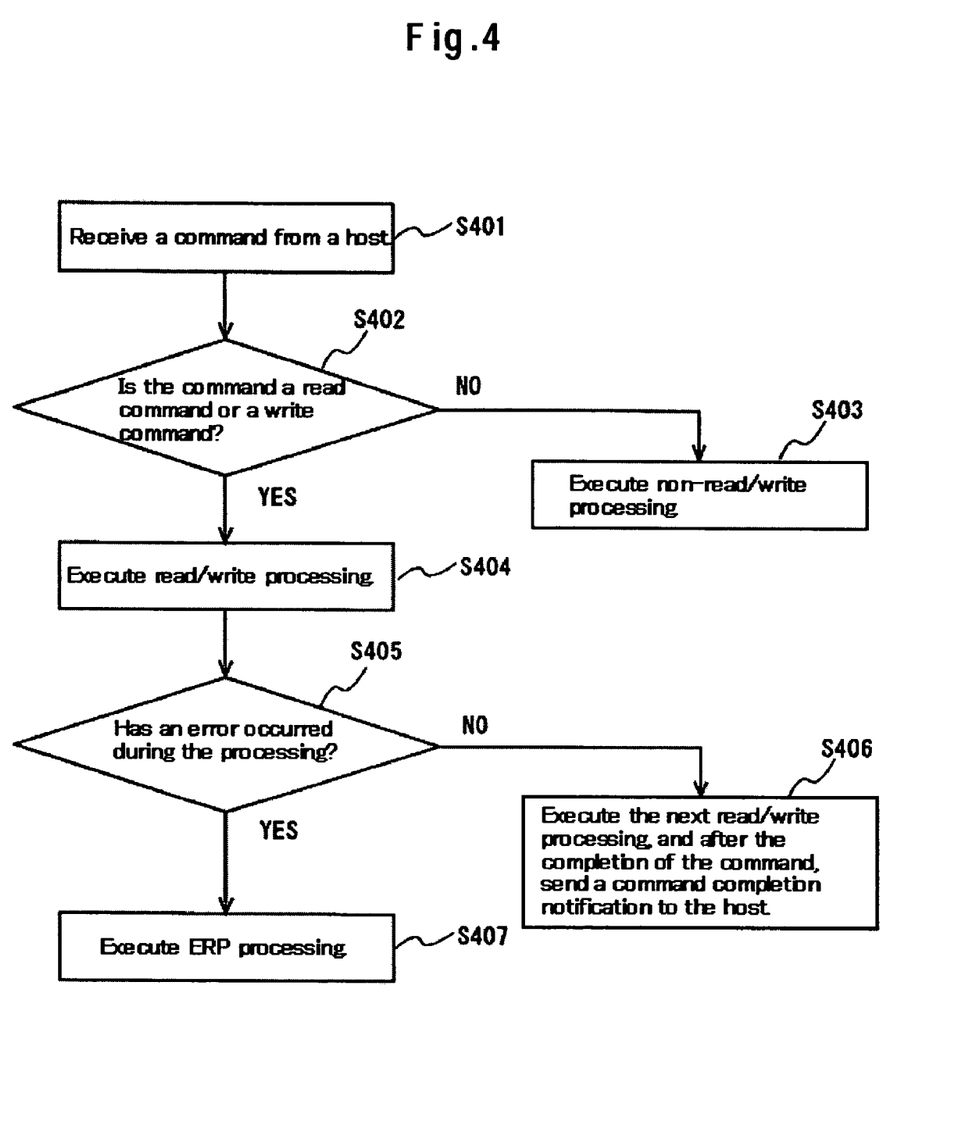
FIG. 4 is a flowchart illustrating the total operation of the logical configuration of the system relating to the ERP of the embodiment.

Upon receipt of the dispatched command, the read/write manager 321 controls R/W processing according to the command and the status. The read/write processing includes address conversion from LBA to a physical address; seek processing that moves a head to a target track; and processing of writing/reading data at a target address. According to the obtained command and current status, the read/write manager 321 requests the read/write execution unit 322 to execute necessary processing.

The read/write execution unit 322 executes the processing requested by the read/write manager 321 (S404). In response to the request processing, the read/write execution unit 322 passes an actual operation execution request to the hardware manager 331. As a result of the operation execution request, actual operation is performed by the other hardware configuration under the control of the hardware manager 331. Upon completion of the operation, the hardware manager 331 notifies the read/write manager 321 of status representing the execution result including the occurrence of an error. If the read/write manager 321 is notified that the processing has been completed in a state in which no error occurs ("NO" of the S405), the read/write manager 321 executes the next processing. As soon as the execution of the command is completed as a result of successfully completing each processing, a command completion notification is sent to the host through the interface handler 301 (S406).

If an error occurs during a series of the processing according to the execution of the command ("YES" of S405), the read/write manager 321 requests the ERP execution unit 323 to execute the ERP processing. As a result, the ERP execution unit 323 executes the ERP processing (S407). The read/write manager 321 notifies the ERP execution unit 323 of an address at which the error has occurred. The ERP execution unit 323 then executes the given error recovery processing for the address.

Figure 5:
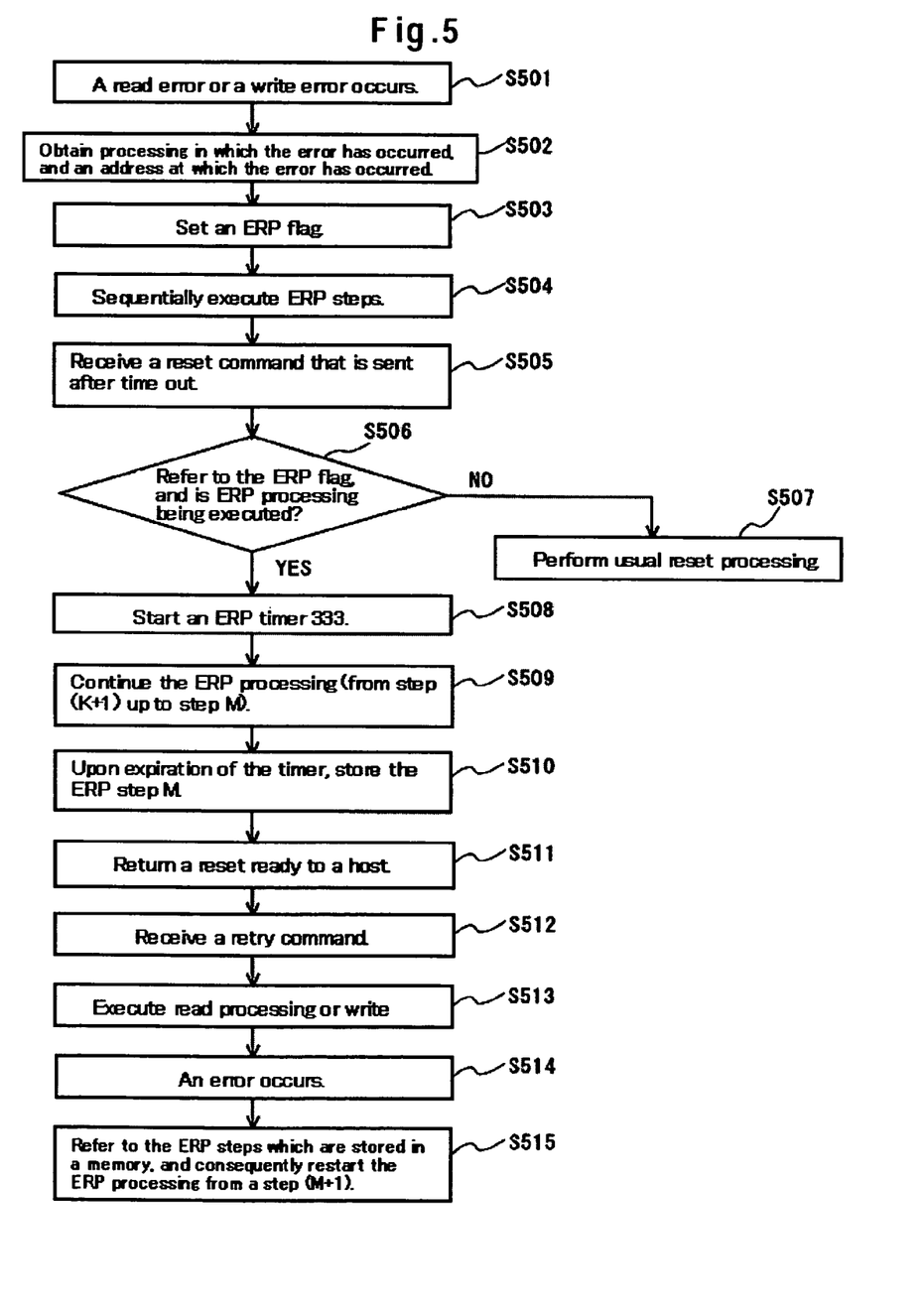
FIG. 5 is a flowchart illustrating steps of the ERP according to the embodiment.

The ERP processing described with reference to FIG. 2 will below be described with reference to the block diagram of FIG. 3 and a flowchart in FIG. 5.

In the event that a read error or a write error occurs at the LBA "A" (S501), the ERP execution unit 323 is called, and then it receives from the read/write manager 321 processing in which the error has occurred, and an address at which the error has occurred (S502). After starting the ERP, the ERP execution unit 323 sets an ERP flag indicating that the ERP is being executed (S503). The ERP execution unit 323 refers to the ERP table 324, and thereby determines an ERP corresponding to the processing in which the error has occurred. According to the ERP steps stored in the ERP table 324, the ERP execution unit 323 passes a request to the hardware manager 331 to sequentially execute the ERP steps starting from the ERP step 1 (S504).

When the issued command has timed out, the host 110 transmits a reset command to the HDD 120. The interface handler 301 receives the reset command through the HDC 128, and then passes it to the command dispatcher 302 (S505). The command dispatcher 302 judges the received command to be a reset command, and accordingly dispatches the reset command to the reset processing unit 332. Upon receipt of the reset command, the reset processing unit 332 refers to the ERP flag, and consequently judges that the ERP processing is being executed (S506). If the ERP is not being executed, usual reset processing is performed (S507). If the ERP is being executed, the ERP timer 333 is started (S508). According to the example shown in FIG. 2, the ERP is being executed, and the ERP execution unit 323 has completed up to the ERP step K.

After the timer 333 is started, the ERP execution unit 323 continuously executes the ERP from the ERP step (K+1) to the ERP step M (S509). If the timer 333 times out at this timing, the ERP execution unit 323 stops the ERP processing, and then stores in the memory 130 the ERP step M that is completed last (S510). In response to the time out of the timer 333, the reset processing unit 332 requests the interface handler 301 to return a reset ready to the host 110 (S511).

If in the retry processing the host 110 issues a retry command (this is the same as the command which has been reset), the retry command is passed to the command dispatcher 302 from the interface handler 301 (S512). The command dispatcher 302 judges it to be a read/write command, and accordingly requests the read/write manager 321 to execute processing of the command. The read/write manager 321 requests the read/write execution unit 322 to execute the processing. As a result, the read processing or the write processing is executed again (S513).

In the event that a read error or a write error occurs again at the LBA "A" (S514), the read/write manager 321 calls the ERP execution unit 323. The read/write manager 321 notifies the ERP execution unit 323 that this is processing of the retry command. The ERP execution unit 323 refers to the ERP steps stored in the memory, and thereby restarts the ERP from the ERP step (M+1) (S515).

As described with reference to FIG. 2, if reread succeeds, the HDD 120 transmits read data to the host 110. If rewrite succeeds, the HDD 120 transmits a command completion notification to the host 110. If the error is not recovered and a reset command is received from the host 110 before all of the ERP steps are completed, the above-mentioned processing is repeated. If the error is not recovered as a result of executing up to the ERP step N which is the last step of the ERP processing, it is recognized as a hardware error in the case of the read command, whereas data is reassigned in the case of the write command.

According to this embodiment, since the ERP processing is continued even after a reset command has been received during the ERP, it is possible to increase the number of ERP steps that can be executed, resulting in the increase in probability of error recovery. Incidentally, it is preferable that the ERP be continued for a given period of time after a reset command is received, and that the ERP be restarted from the ERP step that has been interrupted. However, depending on the design, it is also possible to adopt only the continuation of the ERP processing after the reset command is received. As described in this embodiment, it is preferable to restart the ERP from a step subsequent to the ERP step that has been completed last. However, depending on the design, for example, it is also possible to duplicate the execution of some steps. In this embodiment, the ERP step M which has been completed last is stored. However, stored data does not matter so long as the last completed step can be identified. For example, the step (M+1) to be restarted can also be stored. In this case, it is possible to identify the last completed step by use of the step (M+1).

The relationship between each ERP processing and the logical configuration is not limited to the above-mentioned embodiment. A designer can design a storage device by use of effective functions and effective circuit configurations. In this embodiment, although the HDD 120 can perform both data write processing and data read processing, the present invention can also be applied to a read dedicated device, which performs only read. It is to be noted that although the present invention is in particular useful for magnetic disk storage devices, the present invention can also be applied to storage devices in other modes such as an optical storage device for optically handling stored data.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. An error recovery method for a data storage device, said method comprising:
   in response to occurrence of an error relating to a first command received from a host, starting an error recovery procedure including a plurality of error recovery steps;
   receiving a second command from the host during the error recovery procedure;
   starting a timer in response to the receipt of the second command;
   continuing the error recovery procedure after receiving the second command; and
   after a lapse of predetermined time upon receiving the second command, transmitting to the host a completion notification for the second command;
   stopping the error recovery procedure, which is to be continued, after a lapse of predetermined time upon receiving the second command;
   wherein said stopping the error recovery procedure, which is to be continued, stops the error recovery procedure, which is to be continued, in response to expiration of the timer; and
   wherein said transmitting a completion notification for the second command transmits a completion notification for the second command in response to the expiration of the timer.

2. An error recovery method for a data storage device according to claim 1, wherein said second command is a reset command.

3. An error recovery method for a data storage device according to claim 2, wherein said first command is a read command or a write command.

4. An error recovery method for a data storage device according to claim 1, said method further comprising:
   after transmitting the completion notification for the second command, receiving from the host a retry command for the first command; and
   in processing executed in response to the retry command, restarting the stopped error recovery procedure in response to occurrence of the same error.

5. An error recovery method for a data storage device according to claim 4, wherein said restarting the stopped error recovery procedure restarts the error recovery procedure from an error recovery step subsequent to the error recovery step that has been completed last in the stopped error recovery procedure.

6. A data storage device comprising:
   an interface unit configured to interface with a host for communication data; and
   an error recovery execution unit, which executes an error recovery procedure including a plurality of error recovery steps in response to occurrence of an error relating to a first command received from a host;
   wherein:
   said error recovery execution unit continues the error recovery procedure after receiving a second command; and
   said interface unit transmits to the host a completion notification for the second command after a lapse of predetermined time upon receiving the second command.

7. A data storage device according to claim 6, wherein said error recovery execution unit stops the error recovery procedure after the lapse of predetermined time upon receiving the second command.

8. A data storage device according to claim 6, wherein said second command is a command for canceling the first command.

9. A data storage device according to claim 6, wherein:
   said first command is a read command or a write command.

10. A data storage device according to claim 6, further comprising:
    a time measuring unit configured to measure time in response to receipt of the second command;
    wherein:
    said error recovery execution unit stops the error recovery procedure in response to the time measured by the time measuring unit; and
    said interface unit transmits to the host the completion notification for the second command in response to the time measured by the time measuring unit.

11. A data storage device according to claim 6, wherein in an error recovery procedure for a retry command corresponding to the first command, said error recovery execution unit restarts the stopped error recovery procedure.

12. A data storage device according to claim 11, wherein said error recovery execution unit stores data that can identify an error recovery step that has been completed last in the stopped error recovery procedure, and thereby restarts the stopped error recovery procedure from an error recovery step determined according to the stored data.

13. A data storage device according to claim 11, wherein said error recovery execution unit restarts the stopped error recovery procedure from an error recovery step subsequent to the error recovery step that has been completed last in the stopped error recovery procedure.

14. A data storage device according to claim 6, wherein in an error recovery procedure for a retry command corresponding to the first command, said error recovery execution unit restarts the stopped error recovery procedure in response to occurrence of the same error.

15. A data storage device according to claim 14, wherein said error recovery execution unit stores data that can identify an error recovery step that has been completed last in the stopped error recovery procedure, and thereby restarts the stopped error recovery procedure from an error recovery step determined according to the stored data.

16. A data storage device according to claim 14, wherein said error recovery execution unit restarts the stopped error recovery procedure from an error recovery step subsequent to the error recovery step that has been completed last in the stopped error recovery procedure.

17. A magnetic disk storage device comprising:
    a magnetic disk for storing data of a host;
    an interface unit configured to interface with a host for communication data; and
    an error recovery execution unit, which executes an error recovery procedure including a plurality of error recovery steps in response to occurrence of an error relating to a read command or a write command received from the host;
    wherein:
    after a lapse of predetermined time after the interface unit receives a reset command from the host, the interface unit transmits to the host a completion notification for the reset command; and
    said error recovery execution unit continues the error recovery procedure after receiving the reset command, stops the error recovery procedure after a lapse of predetermined time upon receiving the reset command, and then in response to occurrence of the same error during processing of a retry command corresponding to the read command or the write command, said error recovery execution unit restarts the stopped error recovery procedure from an error recovery step subsequent to an error recovery step that has been completed last in the stopped error recovery procedure.

18. A magnetic disk storage device according to claim 17, further comprising:

a timer configured to measure time in response to receipt of the reset command;

wherein:

said error recovery execution unit stops the error recovery procedure in response to the predetermined time measured by the timer; and said interface unit transmits to the host the completion notification for the reset command in response to the predetermined time measured by the time measuring unit.

* * * * *